United States Patent [19]

Caplan

[11] Patent Number: 4,969,597
[45] Date of Patent: Nov. 13, 1990

[54] MONEY-COLLECTING DEVICE

[76] Inventor: Bruce M. Caplan, 4976 120 SE., Bellevue, Wash. 98006

[21] Appl. No.: 412,647

[22] Filed: Sep. 21, 1989

Related U.S. Application Data

[63] Continuation of Ser. No. 873,830, Jun. 9, 1986, abandoned, which is a continuation of Ser. No. 710,421, Mar. 11, 1985, abandoned.

[51] Int. Cl.⁵ .............................................. B65D 91/00
[52] U.S. Cl. ..................................... 232/43.2; 232/12; 206/0.84; 109/53
[58] Field of Search .......................... 206/0.83, 0.84; 232/43.2, 43.1, 26, 10, 1 P, 12, 14; 109/55, 53, 57, 49; 220/22, 21

[56] References Cited

U.S. PATENT DOCUMENTS

| | | | |
|---|---|---|---|
| 479,464 | 7/1892 | Root | 109/57 |
| 1,127,328 | 2/1915 | Way | 220/22 |
| 2,543,751 | 3/1951 | Atkinson | 206/0.83 |
| 2,681,730 | 6/1954 | Carne | 206/0.83 |
| 3,303,956 | 2/1967 | Curry | 220/22 |
| 4,491,269 | 1/1985 | Sweazey et al. | 232/43.2 |

Primary Examiner—John Weiss
Attorney, Agent, or Firm—Christensen, O'Connor, Johnson & Kindness

[57] ABSTRACT

This money-collecting device comprises an enclosure having a top wall, lying substantially in a horizontal plane when in use, and ends, sides, and a bottom, one of which is hinged to permit insertion and removal of a container. Suitable locking means are provided for the hinged member. The top wall is provided with a plurality of money-receiving slots. A tray member detachably receives intersecting vertical wall members forming, between the walls, a plurality of vertical passageways and the tray member is removably contained in the enclosure. The vertical passageways are aligned with the money-receiving slots.

6 Claims, 3 Drawing Sheets

MONEY-COLLECTING DEVICE

This application is a continuation application based on prior copending application Ser. No. 873,830, filed on Jun. 9, 1986 now abandoned, which is in turn a continuation application of prior copending application Ser. No. 710,421, filed Mar. 11, 1985 now abandoned.

BACKGROUND OF THE INVENTION

Heretofore substantial money losses have occurred in connection with the use of money receiving devices employed in connection with self-service parking lots for automobiles. The cost of providing an attendant for parking lots is such that the same are noncompetitive with unattended or self-service parking lots for automobiles.

Most parking lots for automobiles are provided in noncommercial areas because of the cost of land or are provided on areas where buildings have been torn down and ordinarily the area is one where there is not much pedestrian traffic present which is a factor in the attempt to make the money-receiving devices theftproof. Also, the fact that there are any number of people coming and going which are parking automobiles is another factor of providing a number of people who do not have to account for their presence or activitiies. All in all, the problem of preventing pilfering or stealing from self-service money containers employed in connection with automobile parking lots has become a very serious problem. Heretofore, most parking lot coin-receiving devices used inclined money-receiving slots and it has become quite common for criminals to use wires and the like to "fish out" coins or moneys deposited in such slots and the losses have become very substantial.

Applicant has provided a coin or money slot in an upper surface, which surface when in use, lies in a horizontal plane. This horizontal surface is provided with a plurality of money or coin-receiving slots therethrough, which may number up to such as a hundred or more. Each of these slots of applicant is disposed directly above its own vertical passageway and thus, coins or paper money deposited through a slot drop directly by gravity to the bottom of the passageway associated with a particular slot. Thus, the prior art practice of some in "fishing out" deposited coins and paper money is completely frustrated and in practice a substantially foolproof and theftproof money-depositing device has been provided by devices of the present invention.

Figure 1:
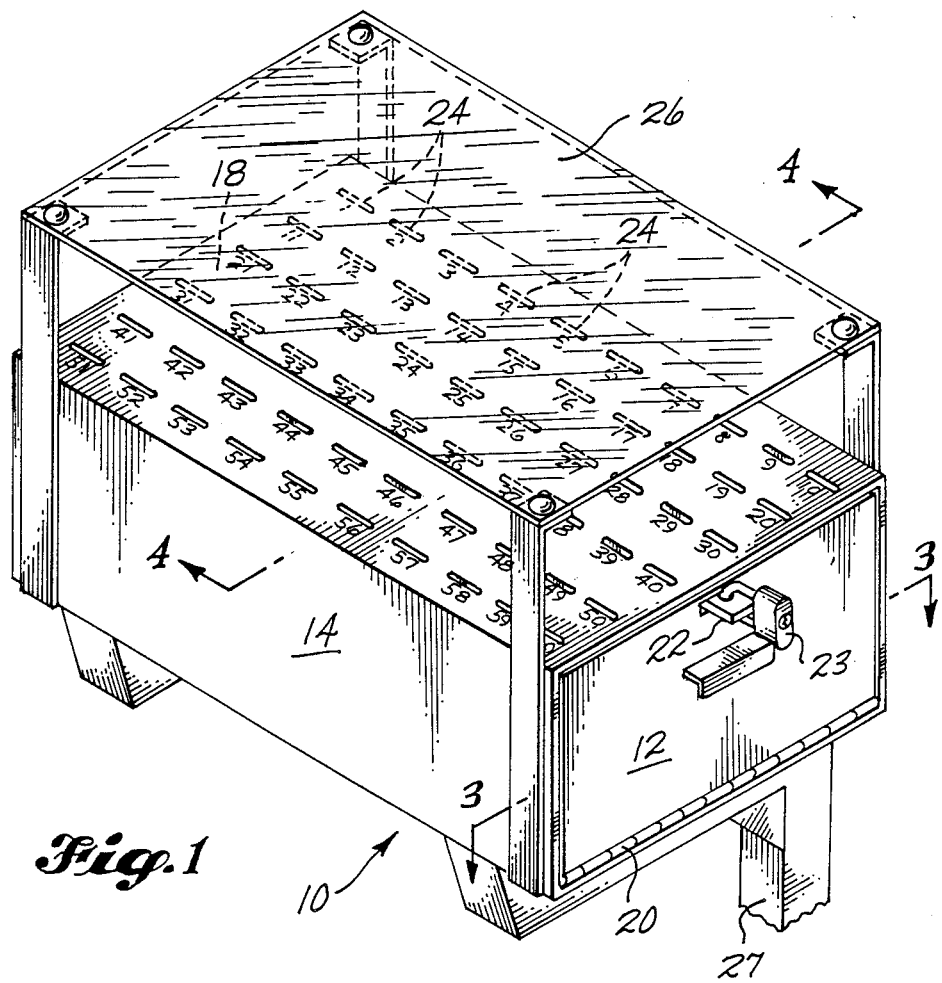
FIG. 1 is a perspective view of a device embodying my invention.
Figure 3:
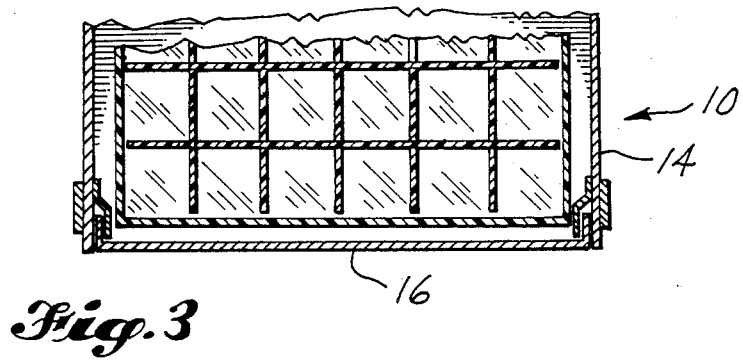
FIG. 3 is a fragmentary sectional view taken substantially on broken line 3—3 of FIG. 1.
Figure 2:
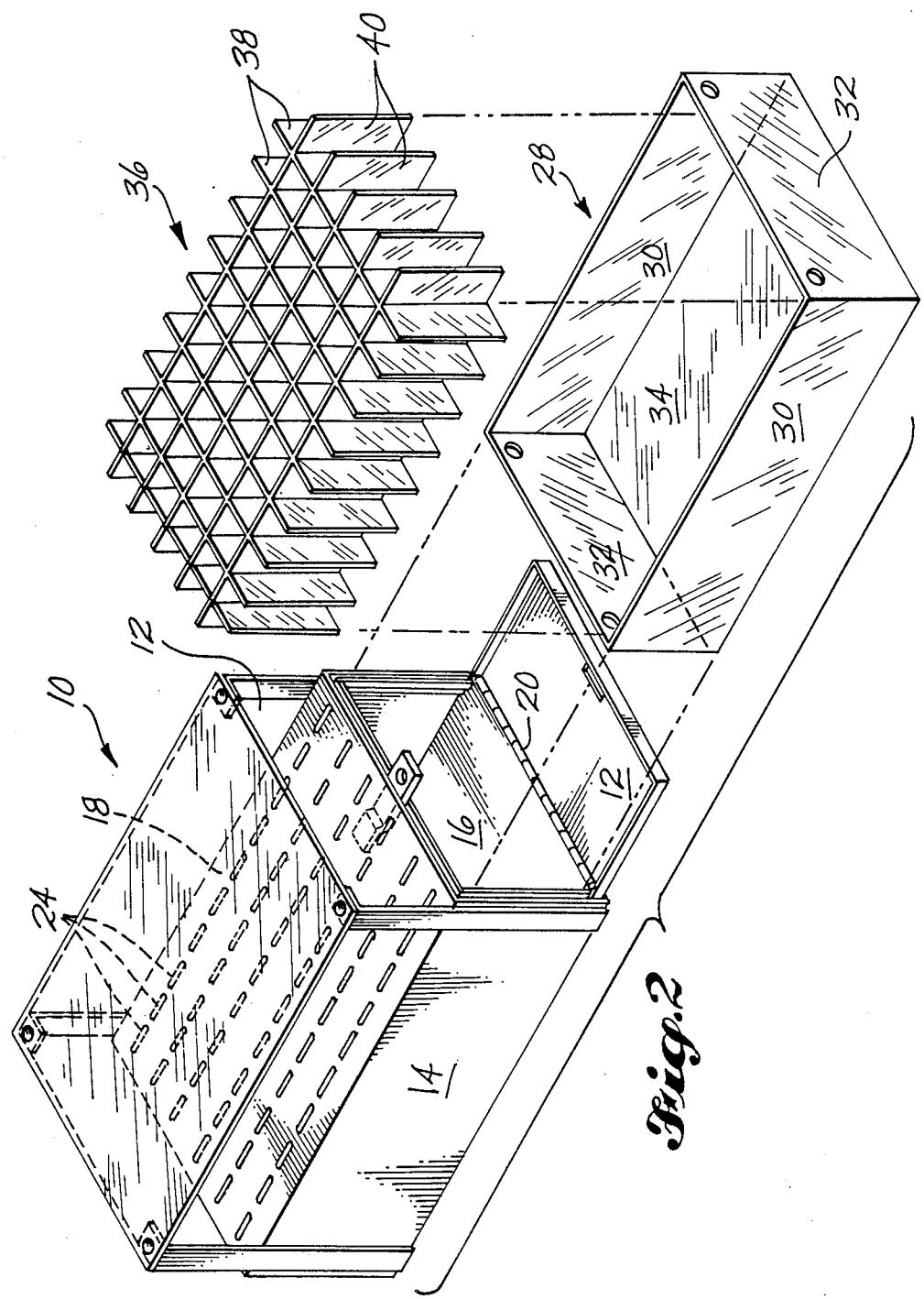
FIG. 2 is an exploded perspective view.

Referring to the drawings, an enclosure device 10 comprises ends 12, sides 14, a bottom 16, and top or upper surface 18. One of these, as an end 12, is hingedly mounted by a hinge 20 to the enclosure device 10. Lug 22 extends from top 18 and can receive a padlock 23.

The upper surface 18, when in use, lies in a horizontal plane. A plurality of numbered and designated coin or money-receiving slots 24 are providing through the upper surface 18. These are arranged in a pattern to cooperate with money-receiving vertical passageways, one below each slot 24 and in registration therewith.

Figure 4:
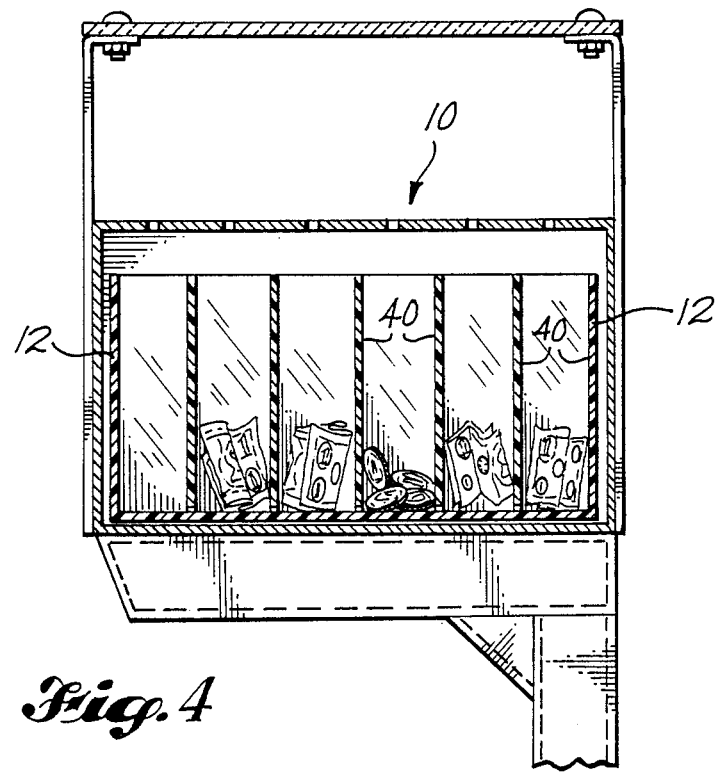
FIG. 4 is a fragmentary sectional view taken substantially on broken line 4—4 of FIG. 1.

Also, when in use, a plate member 26 lies above upper surface 18. The plate member preferably lies in a horizontal plane, and is positioned sufficiently above the upper surface 18 to allow one to readily insert an arm and a hand to selectively place a coin or piece of money in a selected slot 24. The slots 24 are numbered to coincide with the numbers assigned to the particular parking spaces used by a patron or customer of the parking lot. The device is suitably anchored to a fixed support, as a building, pole or the like, by support structure 27 (parts broken away) and shown in FIGS. 1 and 4.

Within the enclosure device 10 is removably mounted a tray 28 which consists of sides 30, ends 32 and a bottom 34. The sides of this tray, as well as the ends, are preferably formed of a translucent material. This tray 28 detachably receives therein an "egg cratelike" construction or vertical passageway forming device 36. Passageway forming device 36 is formed by intersecting vertical walls 38 and 40, which are preferably disposed at right angles to each other. The walls 38 and 40 are also preferably formed of translucent material. As coins and paper money are deposited through a coin or money slot 24 and thus fall by gravity down the registering vertical passageway formed by passageway forming device 36, the attendant can look through the translucent material of the various parts, as mentioned, and thus give proper credit to the particular parking space associated with a particularly numbered designated slot 24. If desired, the bottom 34 may have the various spaces, coinciding with the numbered slots 24, so that if the passageway forming device 36 is removed, money in a particular slot of 36 will lie upon the matching designation (not shown) on the floor or bottom 34 of the tray 28.

The plate member 26 will prevent rain, moisture and the like from entering the money or coin slots 24.

When in use the attendant will call from time to time and unlock lock 23. Then the hinged member, as an end 12, may be turned down and the tray 28 containing the passageway forming device 36 may be removed. As the sides and ends of tray 28 and the walls 38 and 40 are translucent, the coins or paper money which are in a particular slot can be readily credited to the particular parking space associated by number with a particular vertical passageway. If desired, the tray 28 and the passageway forming device 36 may be removed as a unit and another substituted therefor. Then the removed device (28,36) may be moved to a convenience place for counting and properly crediting the moneys received. If it is possible to do this entirely, without removing passageway forming device 36 from the tray 28, this is fine. If any particular passageway in passageway forming device 36 causes difficulties or uncertainties, then a vertical rod may be placed down the particular passageway or passageways involved, and the passageway forming device 36 removed while the proper location of a particular piece of money is confirmed.

Once the moneys have been properly apportioned, then passageway forming device 36, comprising the walls 38 and 40 is removed and all of the moneys will go to the common bottom or inside bottom 34 of the tray 28 for collection thereof by the parking lot attendant.

SUMMARY

It will now be apparent that I have provided a money collecting device for a parking lot and like establishments comprising an enclosure device 10 having an upper surface 18 which when in use lies substantially in a horizontal plane. Said upper surface 18 is provided with a plurality of numbered and readily identifiable money receiving slots 24. The enclosure device 10 comprises ends 12, sides 14, a bottom 16 and an upper surface 18 which lies substantially in a horizontal plane when the device is in use. Also, the enclosure device snugly receives a tray 28 which has sides 30, ends 32 and a bottom 34. Within the tray is an "egg cratelike" construction or vertical passageway forming device 36 comprising vertical walls 36 and 38 which provide a plurality of vertical passageways, one passageway being in registration with each of the money-receiving slots 24. The vertical walls 38 and 40, as well as the side and end walls 30 and 32 of the tray are preferably transparent, so that as the operator looks at the tray, he can readily determine the amount of money to be credited to a particular numbered slot and, in turn, the corresponding parking space associated with such numbered slot.

The plate member 26 is disposed above the upper horizontal surface 18 so that one can readily look through the transparent plate 26 and determine the particular slot 24 by number into which one desires to place coins or paper money in payment for use of the parking space coinciding with a numbered slot 24. The device is readily attached to a suitable support, as a pole or building, and by bracket 27.

Obviously, changes may be made in the forms, dimensions, and arrangements of the parts of my invention without departing from the principles thereof, the above setting forth only preferred forms of embodiment of my invention.

I claim:

1. A money-collecting device, comprising:
   a structure forming an enclosure, the structure including a top having a plurality of money-receiving slots formed therein and a movable member movable between an open position in which access is provided to said enclosure and a closed position in which substantial access to said enclosure is blocked;
   a tray; and
   a passageway forming device supportable by the tray, the passageway forming device comprising a set of mutually parallel first panels and a set of mutually parallel second panels disposed at substantially right angles to the first panels, the panels thereby forming a plurality of passageways extending through the passageway forming device such that money placed into a passageway through a first end can be removed from the passageway through a second, opposite end, the tray and passageay forming device being dimensioned such that they can be moved as a unit into and out of said enclosure when the movable member is in the open position, and such that when the tray and passageway forming device are moved into said enclosure, the passageway forming device forms a passageway beneath each money-receiving slot, the passageway forming device being removable from the tray when the tray and passageway forming device are removed from said structure.

2. The money-collecting device of claim 1, wherein the tray comprises a bottom and sidewalls, and wherein the passageway forming device is dimensioned to be positioned on the bottom and at least partially within the sidewalls of the tray.

3. The money-collecting device of claim 2, wherein said first and second panels are formed of a transparent material.

4. The money-collecting device of claim 2, wherein each of said passageways has a height substantially longer than any width dimension of the passageway.

5. The money-collecting device of claim 1, further comprising a horizontally disposed weather protecting sheet positioned above and spaced from said top.

6. The money-collecting device of claim 5, wherein said weather protecting sheet is composed of a transparent material.

* * * * *